US012107461B2

(12) United States Patent
Lee

(10) Patent No.: US 12,107,461 B2
(45) Date of Patent: Oct. 1, 2024

(54) ELECTRIC COMPRESSOR, INVERTER ASSEMBLY JIG AND INVERTER MANUFACTURING METHOD

(71) Applicant: Hanon Systems, Daejeon (KR)

(72) Inventor: Jae Chul Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 123 days.

(21) Appl. No.: 17/632,577

(22) PCT Filed: Jan. 27, 2021

(86) PCT No.: PCT/KR2021/001095
§ 371 (c)(1),
(2) Date: Feb. 3, 2022

(87) PCT Pub. No.: WO2021/153991
PCT Pub. Date: Aug. 5, 2021

(65) Prior Publication Data
US 2022/0407394 A1   Dec. 22, 2022

(30) Foreign Application Priority Data

Jan. 31, 2020 (KR) .................. 10-2020-0011961
Jan. 20, 2021 (KR) .................. 10-2021-0008280

(51) Int. Cl.
*F25B 1/00* (2006.01)
*F04C 23/02* (2006.01)
(Continued)

(52) U.S. Cl.
CPC .............. *H02K 11/33* (2016.01); *F04C 23/02* (2013.01); *F04C 29/0085* (2013.01);
(Continued)

(58) Field of Classification Search
CPC ...... H02K 11/33; H02K 7/14; H02K 2211/03; F04C 23/02; F04C 29/0085; F25B 31/026
(Continued)

(56) References Cited

U.S. PATENT DOCUMENTS

2015/0372559 A1* 12/2015 Hattori .................. F04B 39/121
310/71
2016/0020657 A1* 1/2016 Hattori .................... H02K 3/50
310/71

(Continued)

FOREIGN PATENT DOCUMENTS

JP   2011155207 A   8/2011
JP   2015223021 A   12/2015
(Continued)

*Primary Examiner* — Davis D Hwu
(74) *Attorney, Agent, or Firm* — Shumaker, Loop & Kendrick, LLP; James D. Miller

(57) ABSTRACT

An electric compressor, an inverter assembly jig and an inverter manufacturing method, an inverter of the compressor includes a frame coupled to a circuit board, the frame includes a base plate opposite the circuit board, fixing means protruding from the base plate and supporting an outer periphery of the circuit board, and a through-hole formed at a position corresponding to the fixing means, the inverter assembly jig includes an expansion pin inserted into the through-hole, and an expansion pin actuation mechanism moving the expansion pin closer to and away from the fixing means, the inverter method includes inserting the expansion pin into the through-hole, manipulating the expansion pin actuation mechanism to deform the fixing means, seating the circuit board on the base plate, and manipulating the expansion pin actuation mechanism so that the fixing means is restored and coupled to the circuit board.

7 Claims, 10 Drawing Sheets

(51) Int. Cl.
*F04C 29/00* (2006.01)
*F25B 31/02* (2006.01)
*H02K 7/14* (2006.01)
*H02K 11/33* (2016.01)

(52) U.S. Cl.
CPC ............. *F25B 31/026* (2013.01); *H02K 7/14* (2013.01); *H02K 2211/03* (2013.01)

(58) Field of Classification Search
USPC .......................................................... 62/498
See application file for complete search history.

(56) References Cited

U.S. PATENT DOCUMENTS

2016/0020664 A1* 1/2016 Hattori .................... F04B 39/00
310/72
2019/0331360 A1 10/2019 Guntermann et al.

FOREIGN PATENT DOCUMENTS

| JP | 2016017412 A | 2/2016 |
| JP | 2019195262 A | 11/2019 |
| KR | 20060054619 A | 5/2006 |
| KR | 101878310 B1 | 7/2018 |

* cited by examiner

ELECTRIC COMPRESSOR, INVERTER ASSEMBLY JIG AND INVERTER MANUFACTURING METHOD

CROSS-REFERENCE TO RELATED PATENT APPLICATIONS

This patent application is a United States nation phase patent application based on PCT/KR2021/001095 filed on Jan. 27, 2021, which claims the benefit of Korean Patent Application No. 10-2020-0011961 filed on Jan. 31, 2020 and Korean Patent Application No. 10-2021-0008280 filed on Jan. 20, 2021, the entire disclosures of which are hereby incorporated herein by reference.

TECHNICAL FIELD

The present disclosure relates to an electric compressor, an inverter assembly jig, and an inverter manufacturing method, and more particularly, to an electric compressor, an inverter assembly jig, and an inverter manufacturing method so that a circuit board and a frame of an inverter may be easily assembled.

BACKGROUND ART

In general, a compressor used in an air conditioning system of a vehicle performs a function of sucking a refrigerant that has been evaporated from an evaporator, making it a high temperature and high-pressure state that is easy to liquefy, and transferring it to a condenser.

Such compressors are divided into a mechanical compressor for performing a compression operation by receiving a driving force from an engine of a vehicle and an electric compressor for performing a compression operation by driving an electric motor (hereinafter referred to as a motor) according to a separate power supply, and in the case of the electric compressor, cooling efficiency is variably adjusted while the rotational speed and torque of the motor are adjusted.

Looking more specifically for the electric compressor, the conventional electric compressor includes a motor for generating power, a compression mechanism for compressing refrigerant by receiving power from the motor, and an inverter for controlling the motor.

Here, the inverter may include a circuit board on which a plurality of elements is mounted and a frame coupled to the circuit board by fixing means.

However, in the conventional electric compressor, as the fixing means is formed of a separate member such as a bolt, it is not easy to assemble the circuit board and frame of the inverter, and the manufacturing cost is increased.

SUMMARY

Accordingly, an object of the present disclosure is to provide an electric compressor, an inverter assembly jig, and an inverter manufacturing method that may facilitate assembly between a circuit board and a frame of an inverter and reduce manufacturing cost.

In order to achieve the object as described above, the present disclosure provides an electric compressor including a motor generating power; a compression mechanism receiving power from the motor and compressing refrigerant; and an inverter controlling the motor, wherein the inverter includes a circuit board on which a plurality of elements is mounted and a frame coupled to the circuit board, and wherein the frame includes fixing means supporting an outer periphery of the circuit board.

The frame may include a base plate facing the circuit board, and a side plate extending from the base plate and protruding toward the circuit board, and the fixing means may be formed on the side plate.

The fixing means may be formed by cutting a part of the side plate, may include one end connected to the side plate and the other end formed as a free end, and may be formed to have elasticity.

The circuit board may include an upper surface facing the frame, a lower surface forming a rear surface of the upper surface, and an edge surface connecting an outer periphery of the upper surface and an outer periphery of the lower surface, and the fixing means may be formed in a hook shape in contact with the lower surface and the edge surface of the circuit board.

The fixing means may be formed in plurality, and through-holes may be formed at positions corresponding to the plurality of fixing means in the base plate.

The frame may include a disk portion and a protrusion portion protruding from the disk portion, at least two of the plurality of fixing means may be formed on the disk portion, and may be formed on opposite sides of each other with respect to an imaginary line passing through a center of the disk portion, and at least one of the plurality of fixing means is formed in the protrusion portion.

A switching element may be disposed on the disk portion.

The fixing means may include a shaft portion extending radially outwardly of the circuit board from the base plate, and a bent portion bent radially inwardly of the circuit board from the shaft portion, and the bent portion may be caught on the outer periphery of the circuit board so that the circuit board and the frame are coupled to each other.

The through-hole may be formed on the side of the circuit board with respect to the fixing means.

On the other hand, the present disclosure provides an inverter assembly jig including an expansion pin inserted into a through-hole of the electric compressor; and an expansion pin actuation mechanism moving the expansion pin closer to and away from the fixing means.

The expansion pin actuation mechanism may include a first plate supported by the base plate on the opposite side of the fixing means with respect to the base plate, and a second plate capable of moving closer to and away from the first plate and the base plate from the opposite side of the base plate with respect to the first plate, and the expansion pin may include a body fixedly coupled to the second plate, a rod hinged to the body and inserted into the through-hole across the first plate, and an elastic member applying elasticity to the rod.

The rod may include an inner circumferential surface opposite to the first plate and an outer circumferential surface opposite to the fixing means forming a rear surface of the inner circumferential surface, the elastic member may apply elasticity to the rod so that the inner circumferential surface is in contact with the first plate, and the first plate may apply a load to the rod so that the outer circumferential surface is in contact with the fixing means.

The inner circumferential surface may include an inclined surface inclined in a direction closer to the first plate as the inclined surface goes away from the body.

The expansion pin may be formed in plurality, and the inclined surface of any expansion pin among the plurality of expansion pins may be formed at the same inclination angle as the inclined surface of another expansion pin among the plurality of expansion pins.

The expansion pin actuation mechanism may further include a positioning pin extending from the first plate toward the base plate, the base plate may further include a hole into which the positioning pin is inserted, and when the positioning pin is inserted into the hole, a distance between the first plate and the base plate may be maintained at a predetermined value, and a distance between an outer circumferential surface of any expansion pin among the plurality of expansion pins and a fixing means opposing the outer circumferential surface of any expansion pin may be equal to a distance between an outer circumferential surface of another expansion pin among the plurality of expansion pins and a fixing means opposite to the outer circumferential surface of another expansion pin.

In addition, the present disclosure provides an inverter manufacturing method including inserting the expansion pin of the inverter assembly jig into the through-hole; manipulating the expansion pin actuation mechanism to move the expansion pin closer to fixing means so as to deform the fixing means; seating the circuit board on the base plate; manipulating the expansion pin actuation mechanism to move the expansion pin away from the fixing means so that the fixing means is restored and coupled to the circuit board; and withdrawing the expansion pin from the through-hole.

In an electric compressor, inverter assembly jig and inverter manufacturing method according to the present disclosure, an inverter of the electric compressor includes a frame coupled to a circuit board, the frame includes a base plate opposite to the circuit board, fixing means protruding from the base plate and supporting an outer periphery of the circuit board, and a through-hole formed at a position corresponding to the fixing means in the base plate, the inverter assembly jig includes an expansion pin inserted into the through-hole, and an expansion pin actuation mechanism moving the expansion pin closer to and away from the fixing means, the inverter manufacturing method includes inserting the expansion pin into the through-hole, manipulating the expansion pin actuation mechanism to deform the fixing means, seating the circuit board on the base plate, and manipulating the expansion pin actuation mechanism so that the fixing means is restored and coupled to the circuit board, therefore assembly between the circuit board and the frame of the inverter may be facilitated and the manufacturing cost may be reduced.

DETAILED DESCRIPTION OF AN EMBODIMENT

Hereinafter, an electric compressor, an inverter assembly jig, and an inverter manufacturing method according to the present disclosure will be described in detail with reference to the accompanying drawings.

Figure 1:
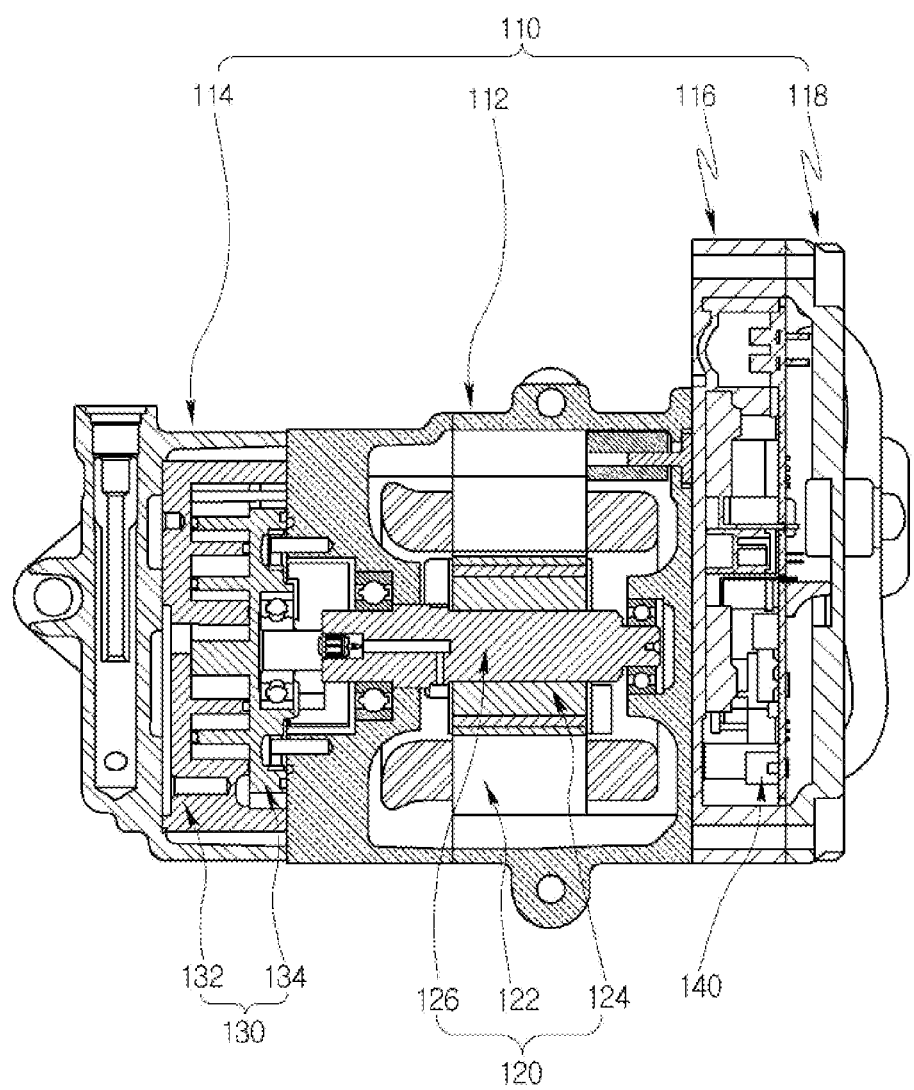
FIG. 1 is a cross-sectional view illustrating an electric compressor according to an embodiment of the present disclosure.
Figure 2:
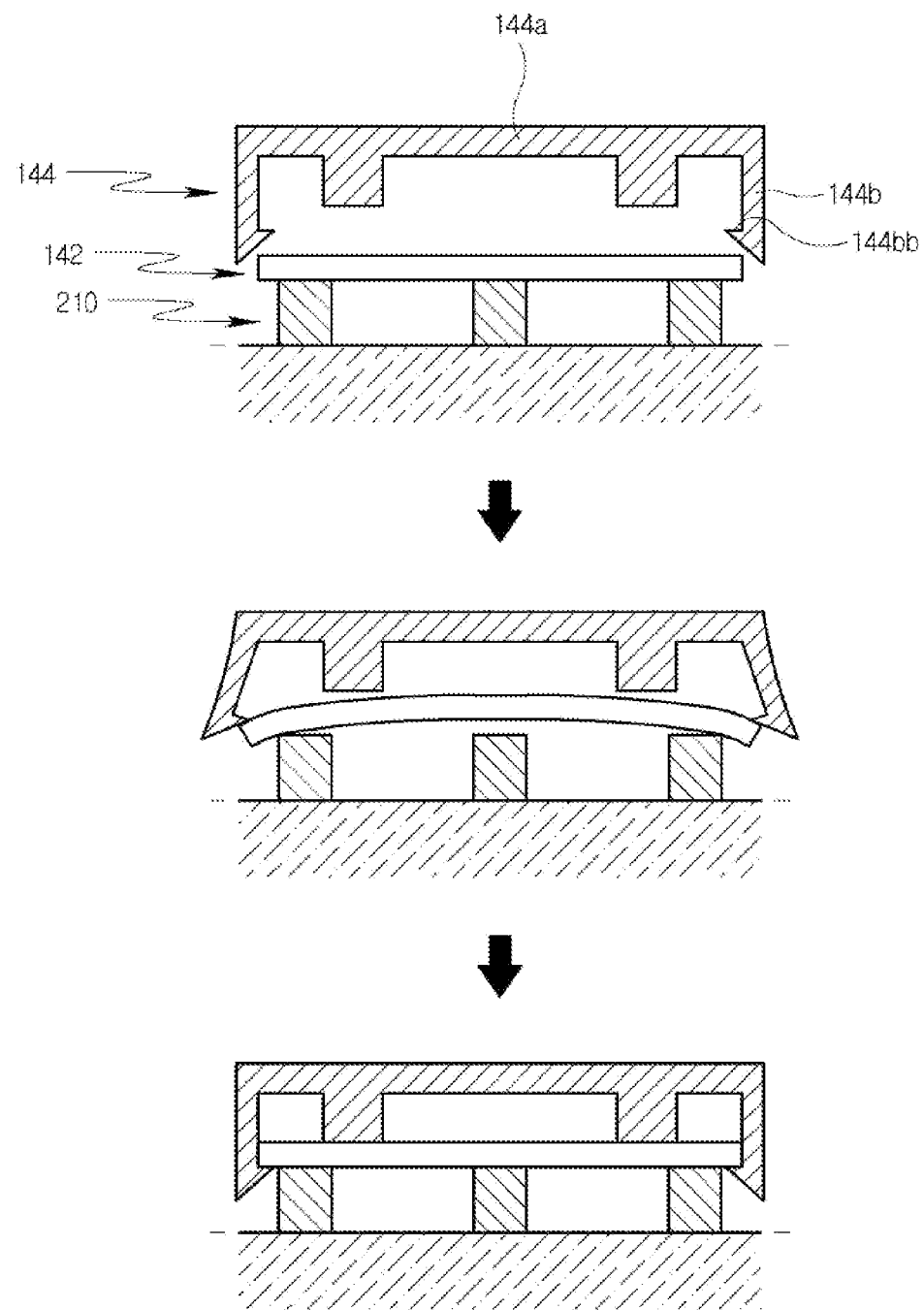
FIG. 2 is a cross-sectional view schematically illustrating a coupling process of a circuit board and a frame in the electric compressor of FIG. 1.

FIG. 1 is a cross-sectional view illustrating an electric compressor according to an embodiment of the present disclosure, and FIG. 2 is a cross-sectional view schematically illustrating a coupling process of a circuit board and a frame in the electric compressor of FIG. 1.

Referring to FIGS. 1 and 2, an electric compressor 100 according to an embodiment of the present disclosure may include a housing 110, a motor 120 provided in an inner space of the housing 110 and generating power, a compression mechanism 130 receiving power from the motor 120 to compress refrigerant, and an inverter 140 controlling the motor 120.

The housing 110 may include a motor housing 112 having a motor accommodation space in which the motor 120 is accommodated, a front housing 114 coupled to one side of the motor housing 112 and receiving the compression mechanism 130, a rear housing 116 coupled to the other side of the motor housing 112 and receiving the inverter 140, and an inverter cover 118 coupled to the rear housing 116 and covering the inverter 140.

The motor 120 may include a stator 122 fixed to the inside of the motor housing 112, a rotor 124 positioned inside the stator 122 and rotated by interaction with the stator 122, and a rotating shaft 126 coupled to the rotor 124 and rotating together with the rotor 124.

The compression mechanism 130 may include a fixed scroll 132 fixedly installed, and an orbiting scroll 134 engaged with the fixed scroll 132 to form a compression chamber and orbitally moved by the rotating shaft 126. Here, in the present embodiment, the compression mechanism 130 is formed in a so-called scroll type, but is not limited thereto, and may be formed in other types such as a reciprocating type, a vane rotary type, and the like.

The inverter 140 may include a circuit board 142 on which a plurality of elements required for inverter control are mounted and a frame 144 coupled to the circuit board 142.

Here, the frame 144 may include a fixing means 144$b$ for supporting the circuit board 142, and the fixing means 144$b$ and the frame 144 may be integrally formed.

Specifically, the frame 144 includes a base plate 144$a$ facing the circuit board 142 and a side plate 144$e$ extending from the base plate 144$a$ and protruding toward the circuit board 142, and the fixing means 144$b$ may be formed on the side plate 144$e$.

At this time, the fixing means 144b is formed in plurality, and each of the plurality of fixing means 144b may be formed by cutting a part of the side plate 144e, may be formed one end connected to the side plate 144e and the other end formed as a free end, and may be formed to have elasticity.

In addition, the circuit board 142 includes an upper surface facing the frame 144, a lower surface forming a rear surface of the upper surface, and an edge surface connecting an outer periphery of the upper surface and an outer periphery of the lower surface, and each of the plurality of fixing means 144b may be formed in a hook shape in contact with a lower surface and an edge surface of the circuit board.

The circuit board 142 and the frame 144 according to this configuration may be coupled to each other by an inverter manufacturing method as illustrated in FIG. 2.

That is, the circuit board 142 may be mounted on a first inverter assembly jig 210, and the frame 144 may be spaced apart from the opposite side of the first inverter assembly jig 210 with respect to the circuit board 142. Here, the frame 144 may be disposed such that the fixing means 144b faces toward the circuit board 142.

In addition, the frame 144 may be moved toward the circuit board 142. Here, when the frame 144 is further moved toward the circuit board 142 after the plurality of fixing means 144b come into contact with the outer periphery of the circuit board 142, the plurality of fixing means 144b is pressed and deformed by the circuit board 142, an interval between the plurality of fixing means 144b may be increased, and the circuit board 142 may pass between the plurality of fixing means 144b to be seated (accommodated) on the base plate 144a.

Then, when the circuit board 142 is seated on the base plate 144a, the plurality of fixing means 144b is restored, and the circuit board 142 is caught by a bent portion 144bb of the fixing means 144b, so that assembly between the circuit board 142 and the frame 144 may be completed.

On the other hand, in this case, in the process of assembling between the circuit board 142 and the frame 144, bending deformation of the circuit board 142 may occur, causing damage to the plurality of elements mounted on the circuit board 142 and damaging the fixing means 144b.

In consideration of this, an electric compressor, an inverter assembly jig, and an inverter manufacturing method according to another embodiment of the present disclosure as illustrated in FIGS. 3 to 10 may be provided.

Figure 3:
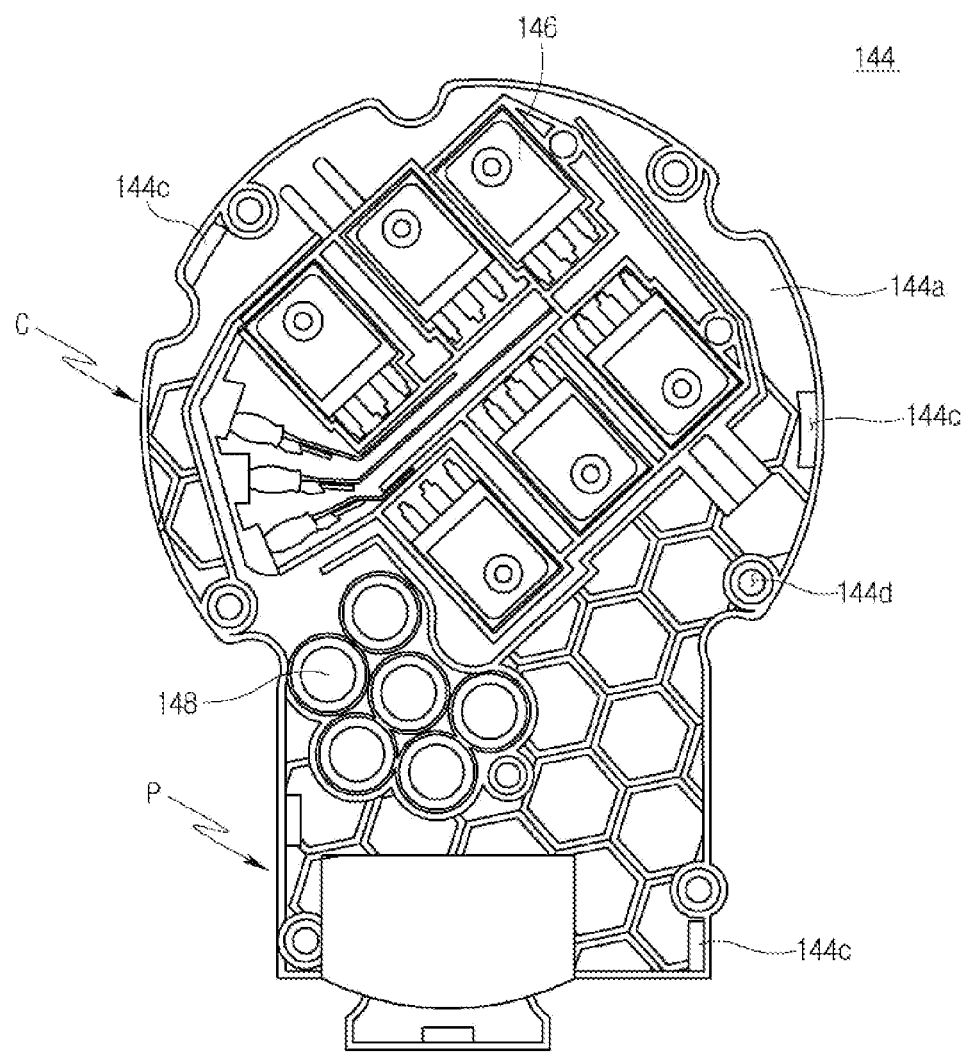
FIG. 3 is a front view illustrating a frame in an electric compressor according to another embodiment of the present disclosure.
Figure 4:
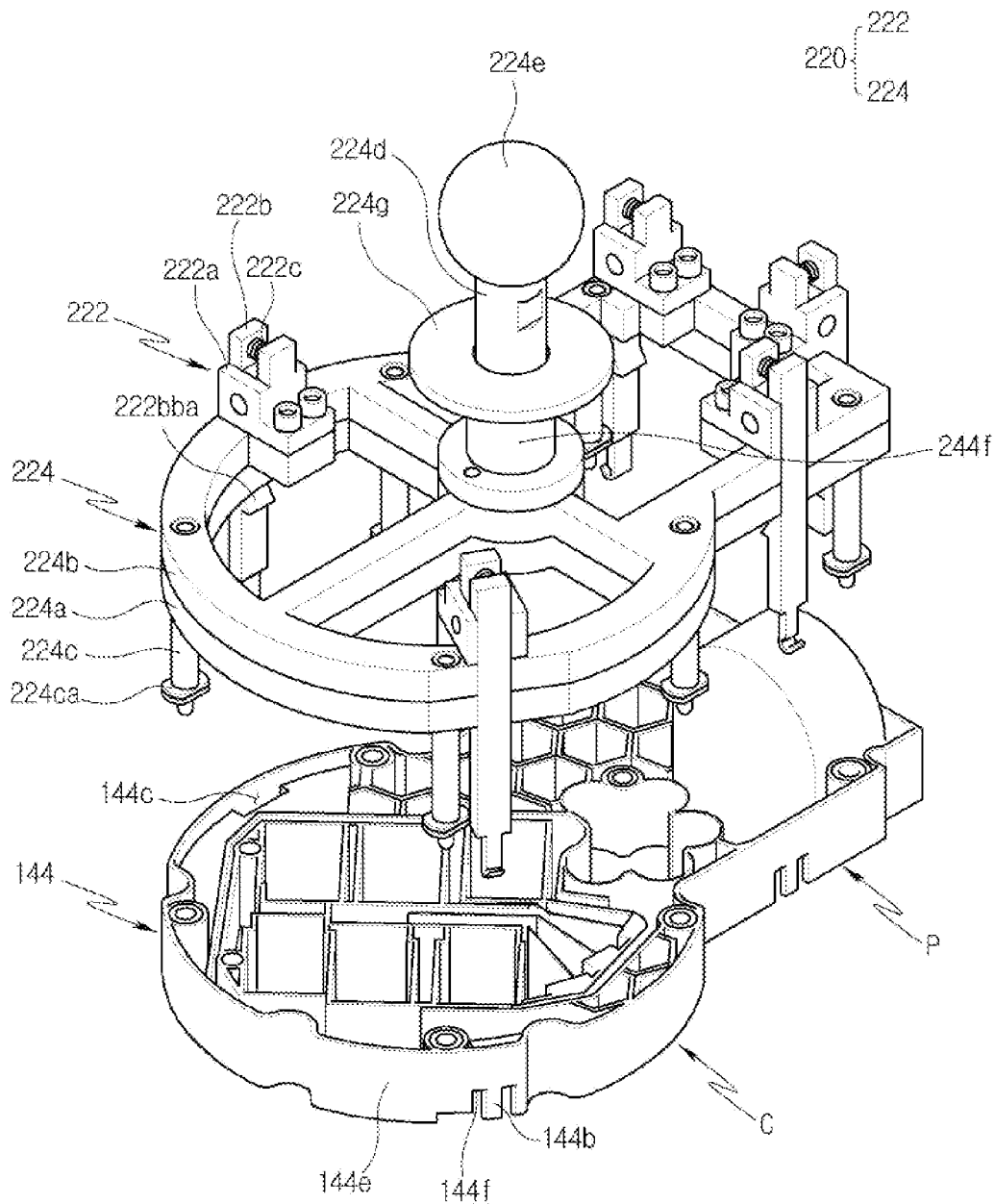
FIG. 4 is a perspective view illustrating an inverter assembly jig for holding the frame of FIG. 3.

FIG. 3 is a front view illustrating a frame in an electric compressor according to another embodiment of the present disclosure, FIG. 4 is a perspective view illustrating an inverter assembly jig for holding the frame of FIG. 3, and FIGS. 5 to 10 are cross-sectional views schematically illustrating a process of coupling a frame to a circuit board with the inverter assembly jig of FIG. 4.

Figure 5:
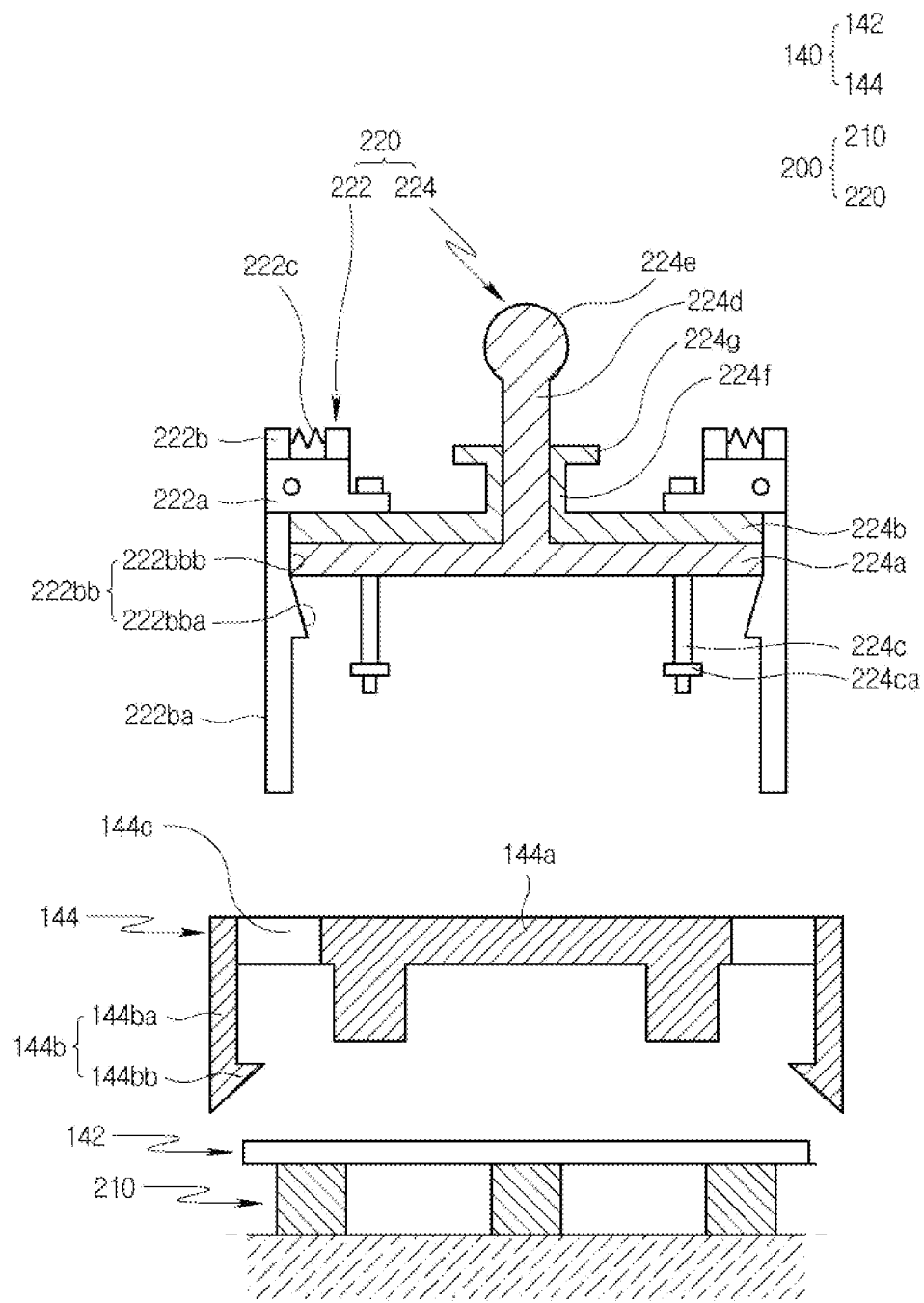
FIG. 5 is a cross-sectional view illustrating a step in which a circuit board, a frame and an inverter assembly jig are provided before the circuit board and the frame are coupled during the process of coupling the frame to the circuit board with the inverter assembly jig of FIG. 4.
Figure 6:
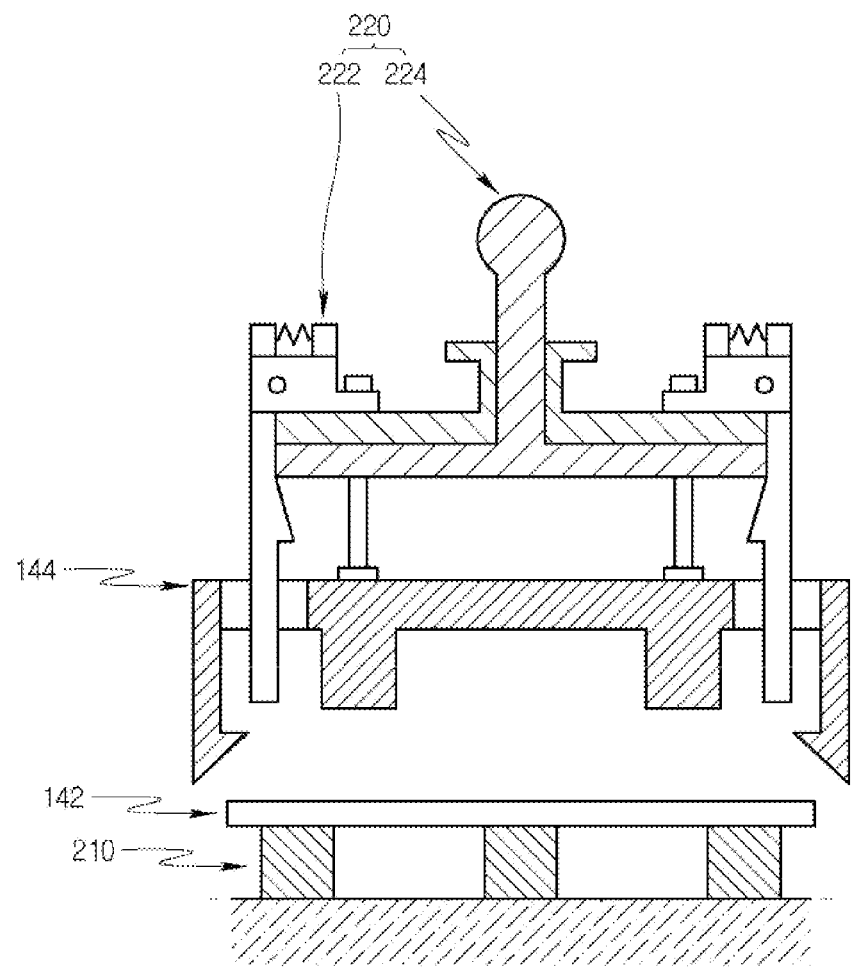
FIG. 6 is a cross-sectional view illustrating a step in which an expansion pin of the inverter assembly jig is inserted into a through-hole of the frame as a next step of FIG. 5.
Figure 7:
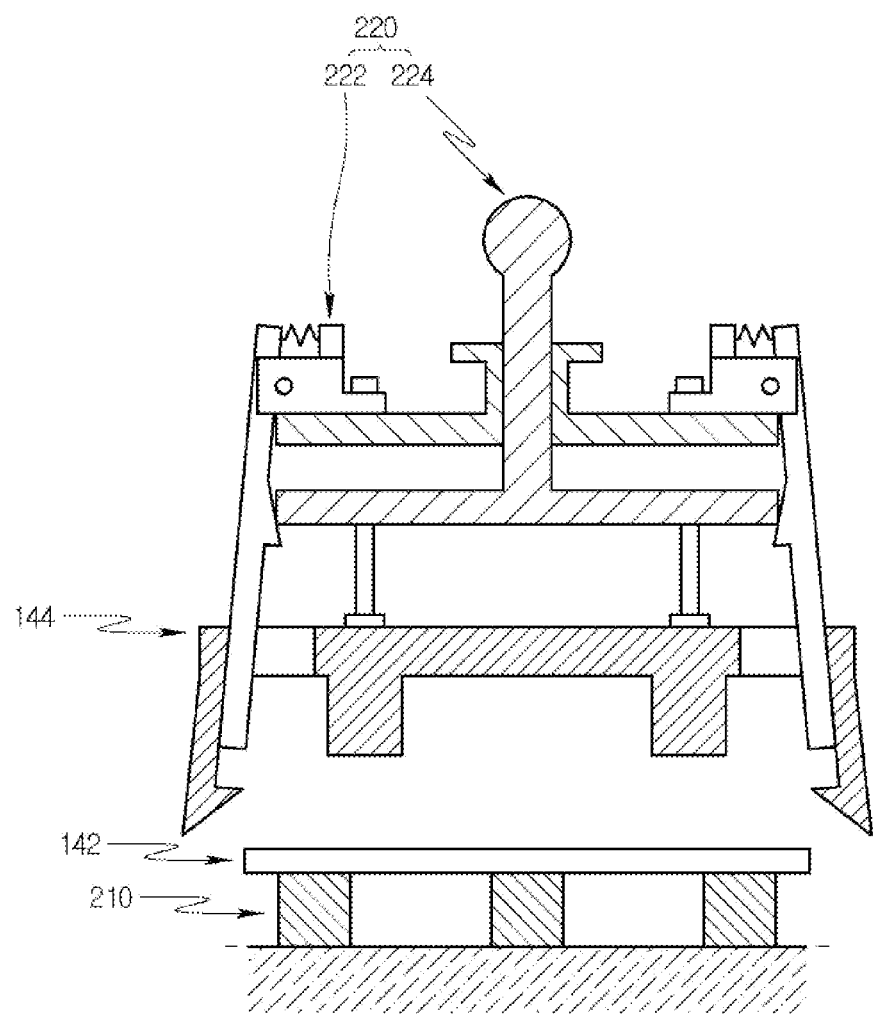
FIG. 7 is a cross-sectional view illustrating a step in which the expansion pin deforms fixing means as a next step of FIG. 6.
Figure 8:
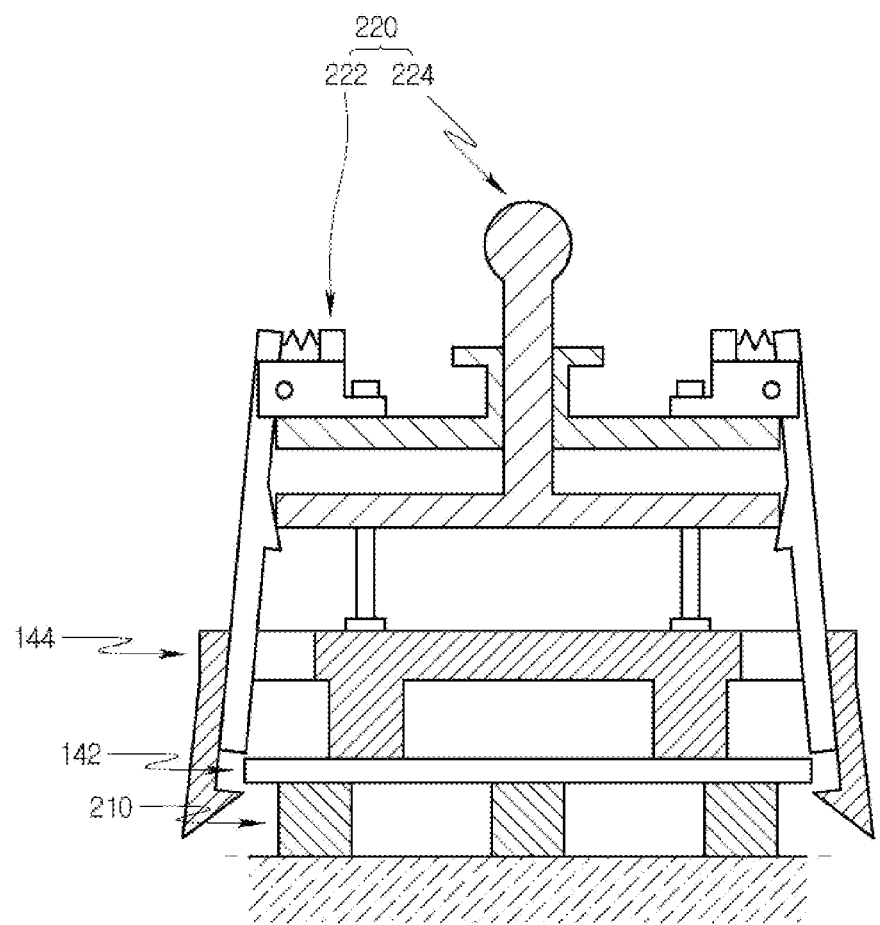
FIG. 8 is a cross-sectional view illustrating a step in which the circuit board is seated on a base plate of the frame as a next step of FIG. 7.
Figure 9:
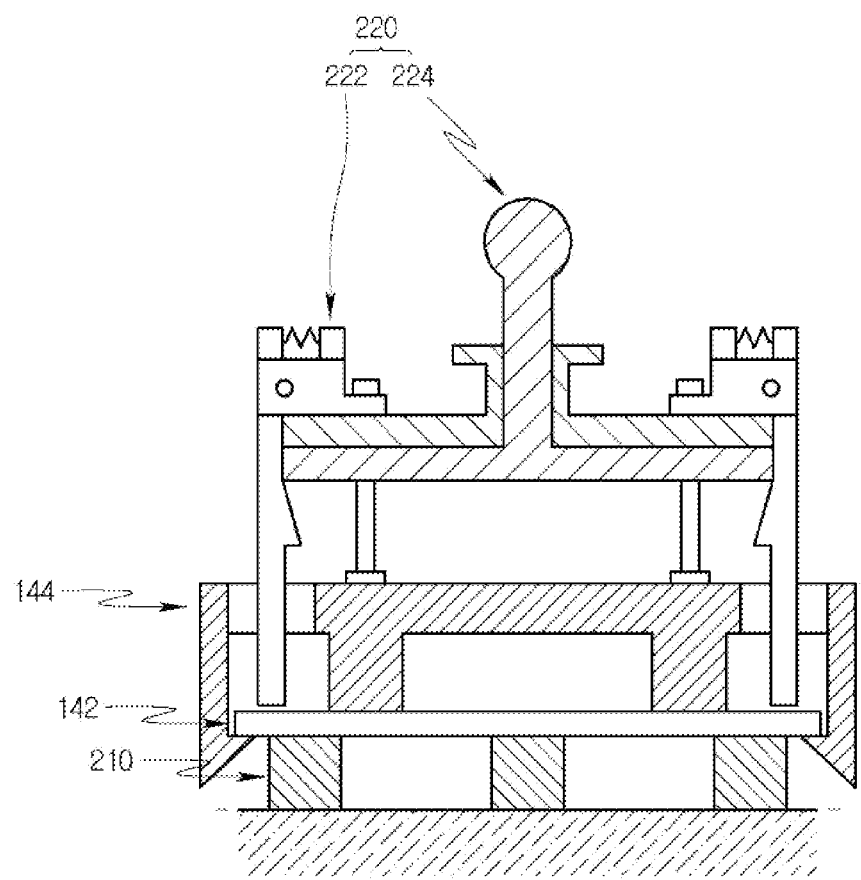
FIG. 9 is a cross-sectional view illustrating a step in which the fixing means is restored and coupled to the circuit board as a next step of FIG. 8.
Figure 10:
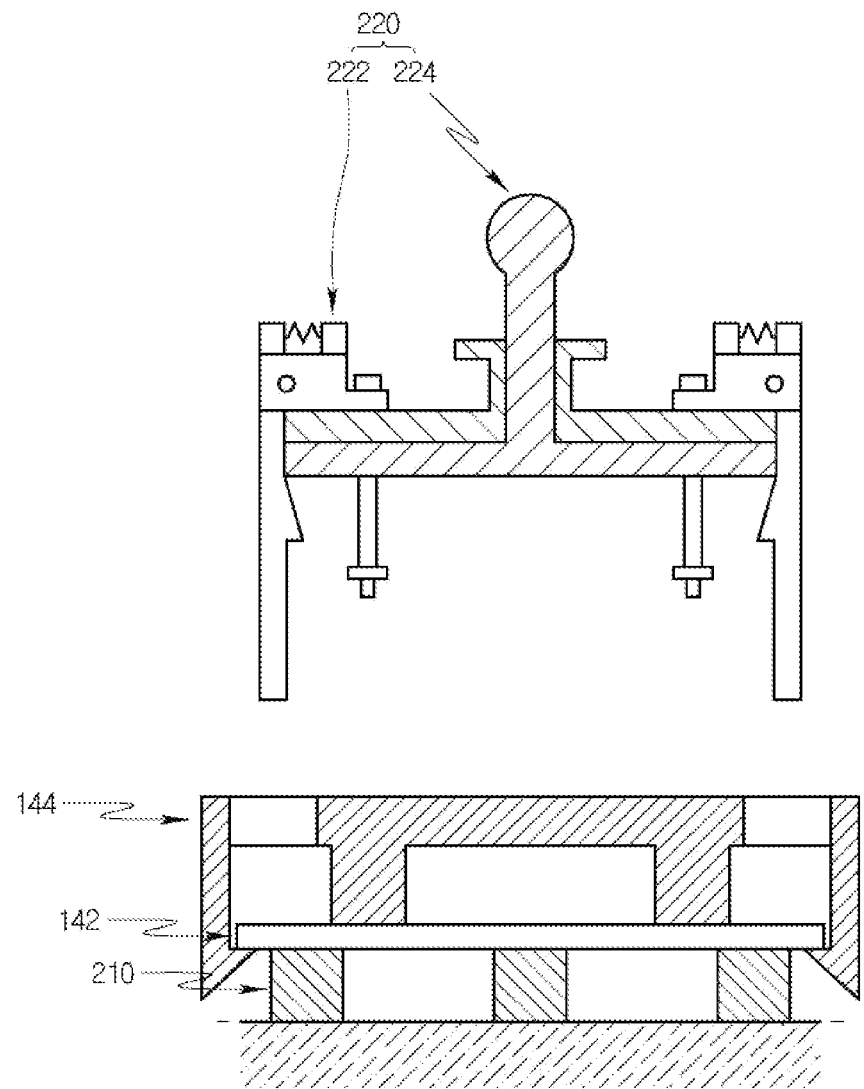
FIG. 10 is a cross-sectional view illustrating a step in which the expansion pin is drawn out from the through-hole and assembly between the circuit board and the frame is completed as a next step in FIG. 9.

Here, FIG. 5 is a cross-sectional view illustrating a step in which a circuit board, a frame and an inverter assembly jig are provided before the circuit board and the frame are coupled, FIG. 6 is a cross-sectional view illustrating a step in which an expansion pin of the inverter assembly jig is inserted into a through-hole of the frame as a next step of FIG. 5, FIG. 7 is a cross-sectional view illustrating a step in which the expansion pin deforms fixing means as a next step of FIG. 6, FIG. 8 is a cross-sectional view illustrating a step in which the circuit board is seated on a base plate of the frame as the a step of FIG. 7, FIG. 9 is a cross-sectional view illustrating a step in which the fixing means is restored and coupled to the circuit board as a next step of FIG. 8, and FIG. 10 is a cross-sectional view illustrating a step in which the expansion pin is drawn out from the through-hole and assembly between the circuit board and the frame is completed as a next step in FIG. 9.

Referring to FIGS. 1 and 3 to 10, a frame 144 may include a disk portion C disposed at a position corresponding to a motor 120 and a protrusion portion P protruding from the disk portion C.

And, the frame 144 may include a base plate 144a facing the circuit board 142, a side plate 144e extending from the base plate 144a and protruding toward the circuit board 144a, a fixing means 144b formed on the side plate 144e and supporting an outer periphery of the circuit board 142, and a through-hole 144c passing through the base plate 144a at a position corresponding to the fixing means 144b so that an expansion pin 222 of a second inverter assembly jig 220, which will be described later, may be inserted.

The base plate 144a may be formed over both a region of the disk portion C and a region of the protrusion portion P.

In addition, a switching element 146 (e.g., an insulated gate bipolar transistor (IGBT), an intelligent power module (IPM), etc.) may be disposed in the region of the disk portion C of the base plate 144a.

In addition, a filter element 148 (e.g., a capacitor, a condenser) may be disposed in the region of the protrusion portion P of the base plate 144a.

The base plate 144a includes a frame hole 144d, and a positioning pin 224c of a second inverter assembly jig 220 to be described later is inserted into the frame hole when the circuit board 142 and the frame 144 are assembled, and a fastening member for fastening the frame 144 to the housing 110 may be inserted into the frame hole after the circuit board 142 and the frame 144 are assembled.

Here, the frame hole 144d may be formed in plurality so that the frame 144 is stably fastened to the housing 110, and a positioning pin 224c to be described later may be formed in the same number as the plurality of frame holes 144d so that an inverter assembly jig 200 to be described later is stably supported.

And, the circuit board 144a may include a circuit board hole formed through the circuit board 144a at a position opposite to the frame hole 144d so as to be fastened together with the frame 144 and the housing 110 by the fastening member, and the circuit board hole may be formed in the same number as the plurality of frame holes 144d.

The fixing means 144b may be formed in plurality so that the circuit board 142 and the frame 144 are stably assembled, and the plurality of fixing means 144b may be arranged along the outer periphery of the base plate 144a.

Here, at least two of the plurality of fixing means 144b may be formed on the disk portion C, and may be formed on opposite sides with respect to an imaginary line passing through a center of the disk portion C.

In addition, at least one of the plurality of fixing means 144b may be formed in the protrusion portion P.

And, each of the plurality of fixing means 144b may include a shaft portion 144ba extending radially outward of the circuit board 142 from the base plate 144a, and a bent portion 144bb bent radially inward of the circuit board 142 from the shaft portion 144ba.

The through-hole 144c may be formed in the same number as the plurality of fixing means 144b to be provided on each side of the plurality of fixing means 144b.

In addition, each of the plurality of through-holes 144c may be formed on the side of the circuit board 142 with respect to the fixing means 144b, so that the spacing between the plurality of fixing means 144b is increased by an expansion pin 222 to be described later presses the fixing means 144b radially outward, and the circuit board 142 may be seated on the base plate 144a without interfering with the plurality of fixing means 144b.

Unexplained reference numeral 144f denotes a cutout.

On the other hand, an inverter assembly jig 200 according to this embodiment may include a first inverter assembly jig 210 for mounting the circuit board 142, and a second inverter assembly jig 220 for holding the frame 144.

Here, referring to FIGS. 4 to 10, the second inverter assembly jig 220 may include an expansion pin 222 inserted into the through-hole 144c of the frame 144, and an expansion pin actuation mechanism 224 for moving the expansion pin 222 closer to and away from the fixing means 144b of the frame 144.

The expansion pin 222 may be formed in the same number as the plurality of through-holes 144c to be inserted into the plurality of through-holes 144c.

In addition, each of the plurality of expansion pins 222 may include a body 222a fixedly coupled to a second plate 224b to be described later, a rod 222b hinged to the body 222a and inserted into the through-hole 144c across an outside of a first plate 224a to be described later, and an elastic member 222c for applying elasticity to the rod 222b.

The body 222a may be formed to be attachable to and detachable from a second plate 224b to be described later so that the number and position of the expansion pin 222 may be adjusted according to the number and position of the through-hole 144c that are different for each specification of the electric compressor 100.

The rod 222b may include an outer circumferential surface 222ba opposite to the fixing means 144b, and an inner circumferential surface 222bb that forms a rear surface of the outer circumferential surface 222ba and faces a first plate 224a to be described later.

The outer circumferential surface 222ba may be formed in a uniform plane.

The inner circumferential surface 222bb may include an inclined surface 222bba inclined in a direction closer to a first plate 224a, which will be described later, as it goes away from the body 222a, and a non-inclined surface 222bbb parallel to the outer circumferential surface 222ba between the body 222a and the inclined surface 222bba.

Here, any expansion pin among the plurality of expansion pins 222 may be formed to be the same as the other expansion pin among the plurality of expansion pins 222. More precisely, the thickness between the outer circumferential surface 222ba and the non-inclined surface 222bbb of any expansion pin may be formed at a level equal to the thickness between the outer circumferential surface 222ba and the non-inclined surface 222bbb of the other expansion pin. And, the inclination angle relationship and the thickness relationship between the outer circumferential surface 222ba and the inclined surface 222bba of any expansion pin may be formed at the same level as the inclination angle relationship and the thickness relationship between the outer circumferential surface 222ba and the inclined surface 222bba of the other expansion pin.

The elastic member 222c may be formed to apply elasticity to the rod 222b in a direction in which the inner circumferential surface 222bb contacts an outer circumferential surface of a first plate 224a to be described later.

The expansion pin actuation mechanism 224 may include a first plate 224a disposed on the opposite side of the fixing means 144b with respect to the base plate 144a, a second plate 224b on which the plurality of expansion pins 222 are mounted and movable in a direction toward and away from the first plate 224a and the base plate 144a from an opposite side of the base plate 144a with respect to the first plate 224a, a positioning pin 224c extending from the first plate 224a toward the base plate 144a and being inserted into and supported by the frame hole 144d so that the first plate 224a is supported by the base plate 144a at a predetermined position with respect to the base plate 144a, a piston 224d extending from the first plate 224a to the opposite side of the base plate 144a and passing through the second plate 224b and a cylinder 224f to be described later, a first handle 224e disposed on an end portion of the piston 224d and seated on a palm of one hand of an operator, a cylinder 224f extending from the second plate 224b to an opposite side of the base plate 144a and accommodating the piston 224d, and a second handle 224g extending radially outward from an end portion of the cylinder 224f and gripped by fingers of the one hand.

Here, the expansion pin actuation mechanism 224 may be formed such that the distance between the first plate 224a and the base plate 144a is maintained at the predetermined value when the positioning pin 224c is inserted into the frame hole 144d. To this end, in the present embodiment, a flange portion 224ca caught on a periphery of the frame hole 144d is formed at an end portion of the positioning pin 224c, but is not limited thereto.

And, the expansion pin actuation mechanism 224 may be formed such that a distance between the outer circumferential surface 222ba of the rod 222b of any expansion pin among the plurality of expansion pins 222 and the fixing means 144b opposite to the outer circumferential surface 222ba of the rod 222b of any expansion pin is equal to a distance between the outer circumferential surface 222ba of the rod 222b of the other expansion pin among the plurality of expansion pins 222 and the fixing means 144b opposite to the outer circumferential surface 222ba of the rod 222b of the other expansion pin when the positioning pin 224c is inserted into the frame hole 144d.

The inverter assembly jig 200 according to this configuration may be used for assembly between the circuit board 142 and the frame 144 as illustrated in FIGS. 5 to 10. That is, the circuit board 142 and the frame 144 may be assembled by the inverter assembly jig 200 according to an inverter manufacturing method illustrated in FIGS. 5 to 10.

Specifically, referring to FIGS. 5 and 6, after the circuit board 142 is mounted on the first inverter assembly jig 210 and the second inverter assembly jig 220 is disposed to face the frame 144, the expansion pin 222 may be inserted into the through-hole 144c.

Then, when the operator closes the one hand that grips the first handle 224e and the second handle 224g, as illustrated in FIG. 7, the second handle 224g may be moved in a direction closer to the first handle 224e (upward in FIG. 7), the second plate 224b connected to the second handle 224g may be moved in a direction away from the first plate 224a (upward in FIG. 7), and the expansion pin 222 coupled to the second plate 224b may also be moved in a direction away from the first plate 224a (upward in FIG. 7) together with the second plate 224b. Then, the first plate 224a, which was in contact with the non-inclined surface 222bbb, comes into contact with the inclined surface 222bba, and the expansion pin 222 may be rotated in a direction closer to the fixing means 144b. That is, the first plate 224a may apply a load to the rod 222b so that the outer circumferential surface 222ba comes into contact with the fixing means 144b. In addition, the fixing means 144b pressed by the outer circumferential surface 222ba of the rod 222b may be deformed radially outward. That is, the interval between the plurality of fixing means 144b may be increased. Here, the interval between the plurality of fixing means 144b (more precisely, the interval between the bent portions 144*bb*) may be increased to be greater than the radial width of the circuit board 142.

Here, for ease of explanation, although FIGS. 5 to 7 are illustrated as if the expansion pin 222 is inserted into the through-hole 144*c* and spread to grip (deform) the fixing means 144*b* while the frame 144 is floated above the circuit board 142, but actually, the expansion pin 222 is inserted into the through-hole 144*c* while the frame 144 is seated on the ground or the like and spread to grip (deform) the fixing means 144*b*, and then moved above the circuit board 142.

And, as illustrated in FIG. 8, as the second inverter assembly jig 220 and the frame 144 are moved toward the circuit board 142, the circuit board 142 may pass between the plurality of fixing means 144*b* and may be seated on the base plate 144*a*. Here, when the circuit board 142 passes between the plurality of fixing means 144*b*, interference between the circuit board 142 and the plurality of fixing means 144*b* may not occur.

And, when the operator spreads the one hand holding the first handle 224*e* and the second handle 224*g*, as illustrated in FIG. 9, the second handle 224*g* may be moved away from the first handle 224*e* (downward in FIG. 9) by the elastic member 222*c*, the second plate 224*b* connected to the second handle 224*g* may be moved in a direction closer to the first plate 224*a* (downward in FIG. 9), and the expansion pin 222 coupled to the second plate 224*b* may also be moved in a direction closer to the first plate 224*a* (downward in FIG. 9) together with the second plate 224*b*. Then, the first plate 224*a*, which was in contact with the inclined surface 222*bba*, comes into contact with the non-inclined surface 222*bbb*, and the expansion pin 222 may be rotated in a direction away from the fixing means 144*b*. And, the fixing means 144*b*, which is no longer pressed by the outer circumferential surface 222*ba* of the rod 222*b*, may be restored radially inward. That is, the interval between the plurality of fixing means 144*b* may be reduced. Here, the interval between the plurality of fixing means 144*b* (more precisely, the interval between the bent portions 144*bb*) may be reduced to be smaller than the radial width of the circuit board 142. Accordingly, the outer periphery of the circuit board 142 is caught by the bent portion 144*bb* of the fixing means 144*b*, so that the circuit board 142 may be coupled to the frame 144.

And, as illustrated in FIG. 10, when the expansion pin 222 is withdrawn from the through-hole 144*c* and the second inverter assembly jig 220 is removed from the frame 144, the assembly between the circuit board 142 and the frame 144 may be completed.

Here, in the electric compressor 100, the inverter assembly jig 200, and the inverter manufacturing method according to this embodiment, the frame 144 includes the fixing means 144*b* for supporting the outer periphery of the circuit board 142, so that assembly between the circuit board and the frame of the inverter may be facilitated and manufacturing cost may be reduced.

In addition, the through-hole 144*c* is formed on the side of the fixing means 144*b*, the inverter assembly jig 200 includes the expansion pin 222 inserted into the through-hole 144*c* and the expansion pin actuation mechanism 224 for moving the expansion pin 222 in the direction closer to and away from the fixing means 144*b*, and the inverter manufacturing method includes inserting the expansion pin 222 into the through-hole 144*c*, manipulating the expansion pin actuation mechanism 224 to deform the fixing means 144*b*, seating the circuit board 142 on the base plate 144*a*, and manipulating the expansion pin actuation mechanism 224 to restore the fixing means 144*b* to engage the circuit board 142, so that the circuit board 142 may not interfere with the fixing means 144*b* when it passes through the fixing means 144*b* and is seated on the base plate 144*a*. Accordingly, bending deformation of the circuit board 142 may be prevented, thereby preventing damage to the plurality of elements. Also, damage to the fixing means 144*b* may be prevented.

In addition, in the conventional case, the operator presses the frame 144 by hand and assembles it with the circuit board 142. At this time, it was difficult to apply the same level of force to the plurality of fixing means 144*b*. However, in the case of the present embodiment, this problem may be solved. That is, the first plate 224*a* is placed at a predetermined position by the positioning pin 224*c*, so that the distances between the plurality of pins and the plurality of fixing means 144*b* are at the same level. And, the plurality of expansion pins 222 are formed to be identical to each other, so that they are rotated at the same level when rotated by the first plate 224*a*. Accordingly, an equal level of force may be applied to the plurality of fixing means 144*b*. Accordingly, a problem of permanent deformation due to relatively large force being applied to some of the plurality of fixing means 144*b* may be prevented in advance.

The invention claimed is:

1. An electric compressor comprising:
   a motor generating power;
   a compression mechanism receiving power from the motor and compressing refrigerant; and
   an inverter controlling the motor, wherein the inverter comprises a circuit board on which a plurality of elements is mounted and a frame coupled to the circuit board, and wherein the frame comprises a fixing means supporting an outer periphery of the circuit board, wherein the frame comprises a base plate facing the circuit board, and a side plate extending from the base plate and protruding toward the circuit board, wherein the fixing means is formed on the side plate, and wherein the fixing means is formed by cutting a part of the side plate, and comprises a first end connected to the side plate and a second end formed as a free end, and is formed to have elasticity.

2. The electric compressor of claim 1, wherein the circuit board comprises an upper surface facing the frame, a lower surface forming a rear surface of the upper surface, and an edge surface connecting an outer periphery of the upper surface and an outer periphery of the lower surface, and wherein the fixing means is formed in a hook shape in contact with the lower surface and the edge surface of the circuit board.

3. The electric compressor of claim 2, wherein the fixing means is formed in plurality, and wherein through-holes are formed at positions corresponding to the plurality of fixing means in the base plate.

4. The electric compressor of claim 3, wherein the frame comprises a disk portion and a protrusion portion protruding from the disk portion, wherein at least two of the plurality of fixing means are formed on the disk portion, and are formed on opposite sides of each other with respect to an imaginary line passing through a center of the disk portion, and wherein at least one of the plurality of fixing means is formed in the protrusion portion.

5. The electric compressor of claim 4, wherein a switching element is disposed on the disk portion.

6. The electric compressor of claim 3, wherein the fixing means comprises a shaft portion extending radially outwardly of the circuit board from the base plate, and a bent portion bent radially inwardly of the circuit board from the shaft portion, and wherein the bent portion is caught on the outer periphery of the circuit board so that the circuit board and the frame are coupled to each other.

7. The electric compressor of claim 6, wherein the through-holes are formed on the side of the circuit board with respect to the fixing means.

* * * * *